United States Patent
Awasthi et al.

(10) Patent No.: US 11,971,791 B2
(45) Date of Patent: Apr. 30, 2024

(54) AUTOMATED REGIONAL FAILOVER

(71) Applicant: Capital One Services, LLC, McLean, VA (US)

(72) Inventors: Ateet Kumar Awasthi, Mckinney, TX (US); Chris Fields, Roanoke, TX (US); Saral Jain, Mckinney, TX (US); Matt Howarth, Garland, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/887,010

(22) Filed: Aug. 12, 2022

(65) Prior Publication Data

US 2024/0054057 A1 Feb. 15, 2024

(51) Int. Cl.
G06F 11/20 (2006.01)

(52) U.S. Cl.
CPC ...... *G06F 11/2025* (2013.01); *G06F 11/2035* (2013.01); *G06F 2201/85* (2013.01)

(58) Field of Classification Search
CPC ............ G06F 11/2023; G06F 11/2025; G06F 11/203; G06F 11/2033
USPC ........................................................ 714/4.11
See application file for complete search history.

(56) References Cited

U.S. PATENT DOCUMENTS

| | | | |
|---|---|---|---|
| 7,287,116 B2 * | 10/2007 | Iwami | G06F 3/0611 711/170 |
| 10,740,353 B2 | 8/2020 | Horowitz et al. | |
| 10,866,872 B1 | 12/2020 | Gudka et al. | |
| 10,873,592 B1 | 12/2020 | Singh et al. | |
| 11,121,962 B2 | 9/2021 | Michael et al. | |
| 11,126,493 B2 | 9/2021 | Guha et al. | |
| 11,201,865 B2 | 12/2021 | File et al. | |
| 11,233,787 B2 | 1/2022 | Clark et al. | |
| 2015/0234670 A1* | 8/2015 | Shimogawa | G06F 9/45533 718/1 |
| 2018/0167461 A1* | 6/2018 | Shen | G06F 16/182 |
| 2021/0019383 A1 | 1/2021 | Huang et al. | |
| 2021/0036957 A1* | 2/2021 | Kuang | H04L 43/0823 |
| 2021/0279160 A1 | 9/2021 | Huang et al. | |

(Continued)

FOREIGN PATENT DOCUMENTS

CN 115698954 A * 2/2023 .......... G06F 11/2025

*Primary Examiner* — Chae M Ko
(74) *Attorney, Agent, or Firm* — Sterne, Kessler, Goldstein & Fox P.L.L.C.

(57) ABSTRACT

Disclosed herein are system, method, and computer program product embodiments for automatically failing over all services operating on a primary region to a secondary region upon detection or notification of a fault in the primary region. When a fault exists on the primary region, the method traverses each cluster containing services operating on the primary region and prepares an input file including a list of service names identifying each service operating on the primary region. Referencing the input file, the method fails over each service from the primary region to the secondary region by modifying a service weight corresponding to each service. This failover process of services may be done simultaneously with failing over any databases corresponding to the failed-over services from the primary region to the secondary region. The method may also introduce a sleep time after modifying each service weight to avoid any potential throttling issues.

20 Claims, 5 Drawing Sheets

(56) References Cited

U.S. PATENT DOCUMENTS

2021/0303423 A1\* 9/2021 MacCarthaigh .... G06F 11/2025
2022/0027431 A1   1/2022 Zheng et al.

\* cited by examiner

AUTOMATED REGIONAL FAILOVER

FIELD

The present disclosure relates to a method of automatic regional failover. In particular, the method automatically fails over all services/databases at scale from operating on a primary region to a secondary region upon detecting an enterprise platform notification for disaster recovery, regional isolation exercises, or in case of real production outages.

BACKGROUND

Software interfaces and services are often accessible to client devices (e.g., smartphones, personal computers, etc.) over a network connection or through a region. However, if a fault or failure occurs on the region to prevent data retrieval operations, then client devices will lose accessibility to all software interfaces and services operating on the region until the fault is fixed. To prevent or ameliorate this discontinued access to services in the event of a fault on the region, failover operation may be implemented to switch over services operating on a primary region to operating on a backup secondary region.

BRIEF SUMMARY

Disclosed herein are system, apparatus, device, method and/or computer program product embodiments, and/or combinations and sub-combinations thereof for automatically failing over all services operating on a primary region to a secondary region upon detection of a fault in the primary region. The method traverses each cluster containing services operating on the primary region and prepares an input file including a list of service names identifying each service operating on the primary region. Referencing the input file, the method fails over each service from the primary region to the secondary region simultaneously with any databases corresponding to the failed-over services. This method of creating an input file including a list of services names for reference during an automated failover process and simultaneously failing over services and their corresponding databases from the primary region to the secondary region increases the efficiency and reliability of the method of the present disclosure.

In some embodiments, a method of automatic regional failover includes using a processor to determine whether there is a fault in a first region. Based on the determination of the fault, the processor can switch a plurality of services from operating on the first region to a second region by performing the following operations: preparing an input file, modifying a plurality of service weights, and introducing a sleep time after modifying each service weight of the plurality of service weights. The input file can include a plurality of service names, each service name of the plurality of service names identifying a service in the plurality of services operating on the first region. By referencing the input file, the processor can modify each service weight in the plurality of service weights. Each service weight of the plurality of service weights corresponds to a service name in the plurality of service names. Modifying each service weight controls a system load percentage of a service identified by the corresponding service name.

In some examples, the processor can switch the plurality of services from operating on the first region to the second region by further performing operations including switching a plurality of databases from operating on the first region to the second region. Each database of the plurality of databases can correspond to a service name in the plurality of service names.

In some examples, the processor can perform the modification of each service weight of the plurality of service weights simultaneously with the switching of the plurality of databases.

In another embodiment, a system includes a memory for storing instructions and one or more processors, communicatively coupled to the memory, configured to execute the instructions. The instructions causes the one or more processors to determine whether there is a fault in a first region. Based on the determination of the fault, a plurality of services is switched from operating on the first region to a second region by performing the following operations: preparing an input file, modifying a plurality of service weights, and introducing a sleep time after modifying each service weight of the plurality of service weights. The input file can include a plurality of service names, each service name of the plurality of service names identifying a service in the plurality of services operating on the first region. By referencing the input file, each service weight in the plurality of service weights is modified. Each service weight of the plurality of service weights corresponds to a service name in the plurality of service names. Modifying each service weight controls a system load percentage of a service identified by the corresponding service name.

In yet another embodiment, a non-transitory, tangible computer-readable device has instructions stored thereon that, when executed by at least one computing devices, causes the at least one computing device to perform operations. The at least one computing device determines whether there is a fault in a first region. Based on the determination of the fault, a plurality of services is switched from operating on the first region to a second region by performing the following operations: preparing an input file, modifying a plurality of service weights, and introducing a sleep time after modifying each service weight of the plurality of service weights. The input file can include a plurality of service names, each service name of the plurality of service names identifying a service in the plurality of services operating on the first region. By referencing the input file, each service weight in the plurality of service weights is modified. Each service weight of the plurality of service weights corresponds to a service name in the plurality of service names. Modifying each service weight controls a system load percentage of a service identified by the corresponding service name.

Descriptions provided in the summary section represent only examples of the embodiments. Other embodiments in the disclosure may provide varying scopes different from the description in the summary.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Failover operations, also known as switchover operations, "failover" (or "switchover") all services operating on a primary region to a backup secondary region in the event of failure on the primary region. The secondary region may be a standby region located in a different geographical location. Upon receiving an enterprise platform notification for disaster recovery, regional isolation exercises, or real production outages, a user or operator may failover each service from operating on the primary region to operating on the secondary region. This failover process may be performed manually and sequentially such that (1) the user or operator must manually failover each service upon detection of a fault in the primary region, and (2) each service in the sequence must complete the failover process from the primary region to the secondary region before the next service in the sequence may begin the failover process. However, when a large number of services are operating on the primary region, this sequential and manual failover process may take weeks or even months to complete, thus significantly decreasing the efficiency of services operating on the primary region. Furthermore, services operating on the primary region will be unavailable for access by any client devices while a failure exists on the primary region, thus significantly decreasing the reliability of the services operating on the primary region. Therefore, a new technique of automatically failing over all services from the primary region to the secondary region upon detection of a fault in the primary region is needed. Furthermore, it is preferable for the new technique to simultaneously failover databases corresponding to the automatically failed-over services to increase the efficiency and reliability of the failover method of the present disclosure. This new technique will provide a faster recovery time for services operating on the primary region in the event of a planned or unplanned fault on the primary region.

Embodiments described herein are directed to a new technique of automatically failing over all services operating on a primary region to a secondary region upon detection of a fault in the primary region. The technique of the present disclosure prepares an input file including a list of service names identifying each service operating on the primary region. Referencing the input file, the technique fails over each service from the primary region to the secondary region simultaneously with databases corresponding to the failed-over services. This technique of creating an input file including a list of services names for reference during an automated failover process and simultaneously failing over services and their corresponding databases from the primary region to the secondary region increases the efficiency and reliability of the technique of the present disclosure.

Figure 1:
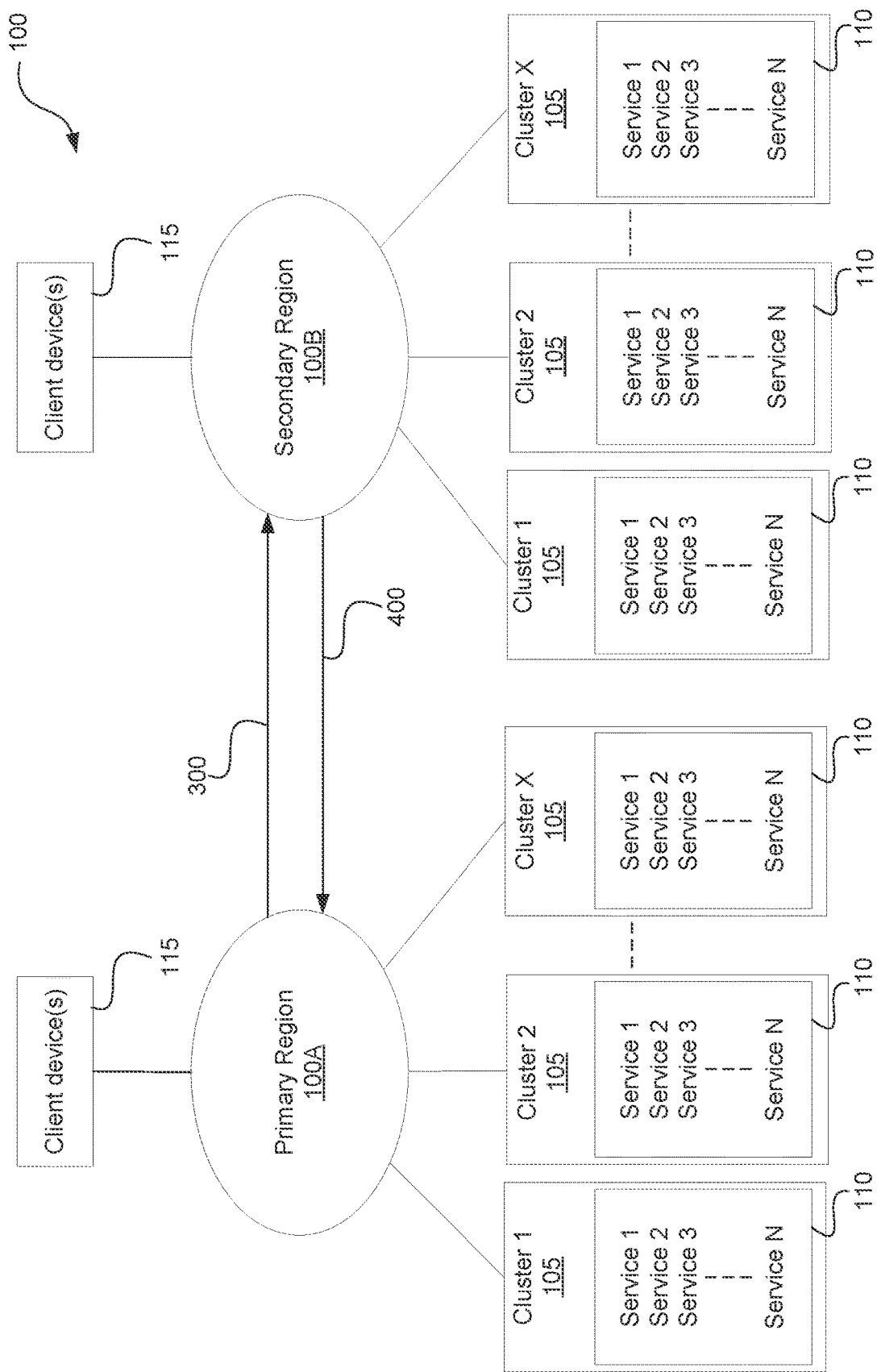
FIG. 1 shows an exemplary region system configuration for implementing an automatic regional failover method according to an embodiment of the present disclosure.

FIG. 1 shows an exemplary region system configuration 100 for implementing an automatic regional failover technique according to an embodiment of the present disclosure. In some embodiments, region system configuration 100 includes a primary region 100A and a secondary region 100B. For example, in the embodiment shown in FIG. 1, primary region 100A may be a primary region providing access to available services at least a majority of the time, whereas secondary region 100B may be a backup secondary region providing access to available services on a standby mode in the event of a fault on the primary region. Secondary region 100B may be located in a different geographical location from primary region 100A. Further, primary region 100A and secondary region 100B may be a single region or a plurality of regions working together.

In this scenario, primary region 100A is chosen to be the primary region because it is closest in geographical proximity to a vendor offering access to the available services. This closeness in geographical proximity allows the vendor to offer access to the available services on primary region 100A with less traffic latency and higher bandwidth than routing the available services through secondary region 100B, which is located in a different geographical location further away from the vendor. Primary region 100A and secondary region 100B may operate on the Internet and/or other public or private networks or combinations thereof. It should be understood by those skilled in the art that region system configuration 100 may include additional regions not exhaustively disclosed herein.

A number of services 110 may operate on primary region 100A such that client devices 115 may access functions and application programming interfaces (APIs) of various services 110 through communication with primary region 100A. For example, client devices 115 may be any electronic device capable of running software applications derived from compiled instructions, including, without limitation, personal computers, smart phones, media players, electronic tablets, game consoles, email devices, etc. Such client devices 115 may access functions and APIs of various services 110 hosted on primary region 100A by forming communication pathways with primary region 100A. Such communication pathways may be enabled by a number of communication protocols, including various TCP/IP (Transmission Control Protocol/Internet Protocol) forms, Bluetooth, Wi-Fi (e.g., the IEEE 802.11 standard), and cellular protocols (e.g., 2G/3G/4G/LTE/5G).

In some embodiments, services 110 operating on primary region 100A may be organized in clusters 105 for better scalability and faster management. For example, clusters 105 may be an elastic container service providing scalability and management of services 110 organized in each cluster 105. By organizing services 110 in elastic container service clusters 105, an operator may utilize the clusters 105 to traverse through services 110, manage services 110, or run and stop an individual service 110 or a single task within a service 110. Services 110 may be organized in clusters 105 based on type of service, size of service, or other parameters not exhaustively disclosed herein. It should be understood by those skilled in the art that each cluster 105 may include any number 1-N of services 110 in various embodiments of the present disclosure. It should also be understood by those skilled in the art that services 110 operating on primary region 100A may be organized in any number 1-X of clusters 105 in various embodiments of the present disclosure.

Secondary region 100B may be the same in configuration as primary region 100A in some embodiments of the present disclosure. In order for secondary region 100B to be a standby region in a different geographical location providing backup service in the event of a fault on primary region 100A, secondary region 100B should host the same services 110 as those hosted on primary region 100A. In some embodiments, the services 110 operating on secondary region 100B may be organized in a structure of clusters 105 that is the same as the cluster structure existing on primary region 100A. In other embodiments, the services 110 operating on secondary region 100B may be organized in a structure of clusters 105 that is different from the cluster structure existing on primary region 100A. Regardless of how services 110 are respectively organized in clusters 105 on primary region 100A and secondary region 100B, both primary region 100A and secondary region 100B should host the same services 110 such that services 110 available on primary region 100A are also readily available on secondary region 100B. This way, in the event of a fault detection on primary region 100A, the automatic regional failover method of the present disclosure may perform failover operation 300 to transfer operation of services 110 from primary region 100A to secondary region 100B. On the other hand, when the detected fault is no longer existing on primary region 100A, the automatic regional failover technique of the present disclosure may perform failback operations 400 to transfer operation of services 110 from secondary region 100B back to primary region 100A. The failover operation 300 and failback operations 400 are described in further detail with respect to FIGS. 3 and 4 below.

Figure 2:
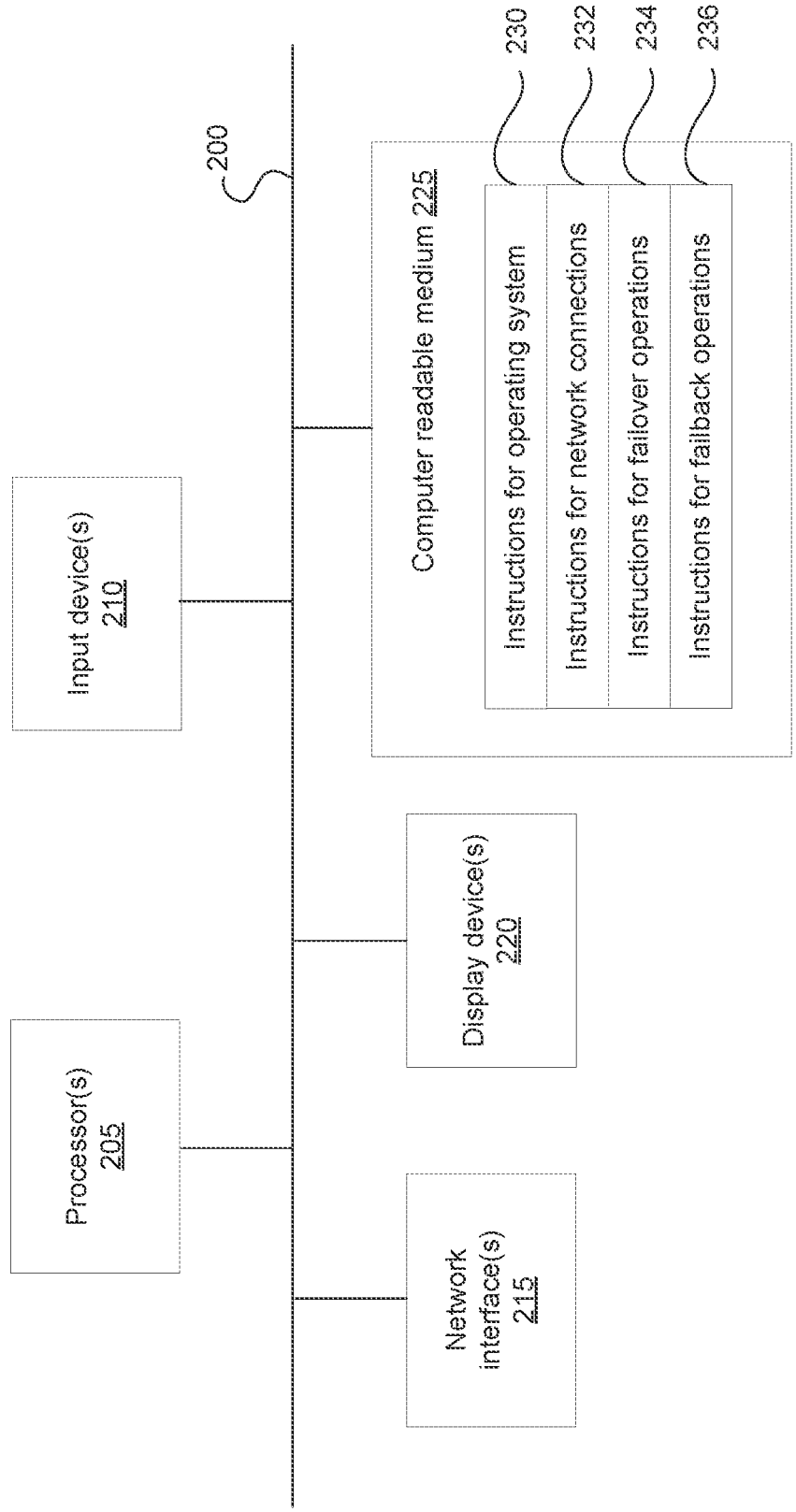
FIG. 2 shows a block diagram of an exemplary region in the exemplary region system configuration illustrated in FIG. 1.

FIG. 2 shows a block diagram of an exemplary region in the exemplary region system configuration 100 illustrated in FIG. 1. For example, the exemplary region shown in FIG. 2 may be primary region 100A or secondary region 100B as shown in FIG. 1. The exemplary region may also be any other regions existing in the region system configuration 100 but not exhaustively described herein. A region is typically a computer, or a group of computers, that runs services to serve the needs of other computers. The exemplary region may be implemented on any electronic device that runs software applications derived from compiling instructions, including, without limitation, personal computers, regions, smart phones, media players, electronic tablets, game consoles, email devices, etc. In some embodiments, the exemplary region may include one or more processors 205, one or more input devices 210, one or more network interfaces 215, one or more display devices 220, and one or more computer readable mediums 225. Each of these components may be coupled by bus 200, which enables communication between various components of the exemplary region.

Bus 200 may be any known internal or external bus technology, including but not limited to ISA, EISA, PCI, PCI Express, NuBus, USB, Serial ATA or FireWire. Processors 205 may use any known processor technology, including but not limited to graphics processors and multi-core processors. Input devices 210 may be any known input device technology, including but not limited to a keyboard (including a virtual keyboard), mouse, track ball, and touch-sensitive pad or display, which allows an operator to manually provide an input to the exemplary region. Display devices 220 may be any known display technology, including but not limited to display devices using Liquid Crystal Display (LCD) or Light Emitting Diode (LED) technology, which allows the exemplary region to output information to the operator. Computer-readable medium 225 may be any medium that participates in providing instructions to processors 205 for execution, including but not limited to non-volatile storage media (e.g., optical disks, magnetic disks, flash drives, etc.), or volatile media (e.g., SDRAM, ROM, etc.).

In some embodiments, computer-readable medium 225 may include various instructions 230-236. In one example, computer-readable medium 225 may include various instructions 230 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input devices 210; sending output to display devices 220; keeping track of files and directories on computer-readable medium 225; controlling peripheral devices (e.g., disk drives, printers, etc.) which can be controlled directly or through an I/O controller; and managing traffic on bus 200. In another example, computer-readable medium 225 may also include various instructions 232 for establishing and maintaining network connections (e.g., software for implementing communication protocols, such as TCP/IP, HTTP, Ethernet, telephony, etc.). In another example, computer-readable medium 225 may further include various instructions 234 to perform failover operations 300 to failover services 110 from primary region 100A to secondary region 100B in the event of detecting a fault on primary region 100A, as described in further detail with respect to FIG. 3 below. In yet another example, computer-readable medium 225 may further include various instructions 236 to perform failback operations 400 to transfer services 110 from secondary region 100B back to primary region 100A after the fault is no longer detected on primary region 100A, as described in further detail with respect to FIG. 4 below. The exemplary instructions described herein are for illustrative purposes only and are not intended to be exhaustive. Those of ordinary skill in the art will recognize that various other types of instructions achieving different purposes may be included in computer-readable medium 225 in other embodiments of the present disclosure.

Figure 3:
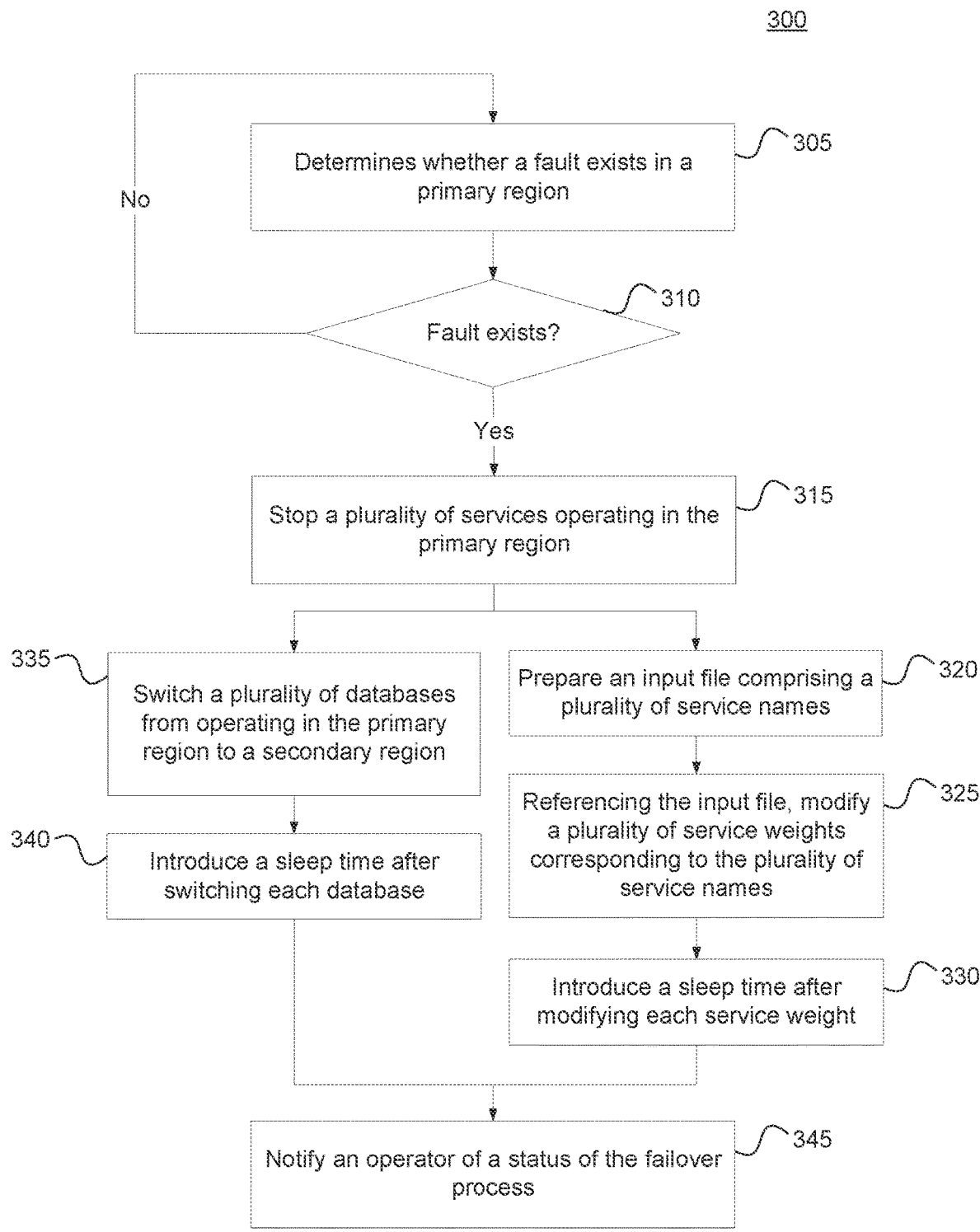
FIG. 3 shows a flowchart illustrating a method for automatically failing over services operating on a primary region to operating on a secondary region according to an embodiment of the present disclosure.
Figure 4:
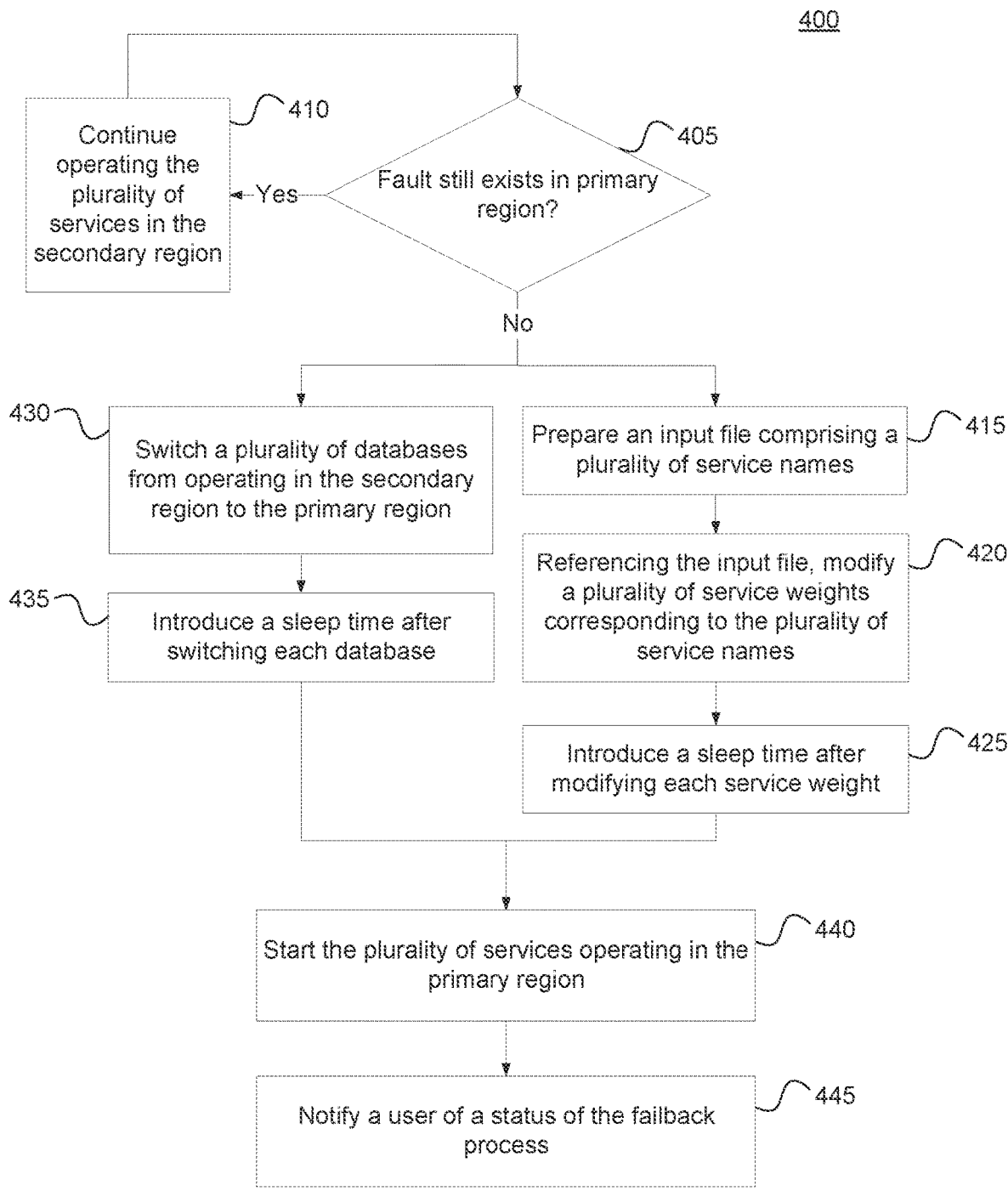
FIG. 4 shows a flowchart illustrating a method for automatically failing back services operating on the secondary region to operating on the primary region according to an embodiment of the present disclosure.

An exemplary method for performing automatic regional failover operations according to some aspects of the present disclosure will now be described with reference to FIGS. 3 and 4. FIG. 3 shows a flowchart illustrating a method 300 for automatically failing over services 110 operating on primary region 100A to operating on secondary region 100B when a fault is detected on primary region 100A, according to some embodiments of the present disclosure. FIG. 4 shows a flowchart illustrating a method 400 for automatically failing back services 110 operating on secondary region 100B to operating on primary region 100A after the fault is no longer detected on primary region 100A, according to some embodiments of the present disclosure. Some operations of failover method 300 and failback method 400 may be performed in a different order and/or vary, and failover method 300 and failback method 400 may include more operations that are not described herein for simplicity.

Referring to FIG. 3, at step 305, failover method 300 determines whether a fault exists in primary region 100A. In some embodiments, this determination is done by processor 205 executing instructions for failover operations 234, as shown in the block diagram of FIG. 2. In other embodiments, this determination is done by a third party cloud services platform (e.g., Enterprise PagerDuty, Amazon Web Services) that then notifies the exemplary region system configuration 100 shown in FIG. 1 in the event of a detected fault. A fault in primary region 100A may include disaster recovery, regional isolation exercises, production or power outages, dust and temperature interference, failure to retrieve data, failure with updates, cybersecurity concerns, etc. It should be understood by those skilled in the art that other embodiments of the present disclosure may include various other fault types not exhaustively enumerated herein. At decision 310, if no fault exists in primary region 100A, then services 110 continue to operate on primary region 100A and failover method 300 infinitely repeats step 305 to determine whether a fault exists in primary region 100A. On the other hand, if a fault does exist in primary region 100A, then failover method 300 proceeds from decision 310 to step 315 to stop all services 110 currently operating on primary region 100A. Services 110 may be stopped sequentially, by cluster 105, randomly, or in another order not exhaustively described herein. After all services 110 are stopped in step 315, failover method 300 proceeds to transfer each service 110 from operating on primary region 100A to operating on secondary region 100B (steps 320-330) while also simultaneously transferring databases corresponding to the failed-over services 110 (steps 335-340), as explained in further detail below. It should be understood by those skilled in the art that in some embodiments, the transferring of each service 110 from operating on primary region 100A to operating on secondary region 100B may be done by a third party cloud services platform (e.g., Amazon Web Services).

To transfer over services 110 from operating on primary region 100A to operating on secondary region 100B, failover method 300 prepares an input file including a list of service names in step 320. Each service name in the input file identifies a service 110 operating on primary region 100A. In some embodiments, processor 205 may prepare the input file by traversing each cluster 105 to retrieve the service name identifying each service 110 operating on primary region 100A. In some embodiments, processor 205 may also retrieve additional API details for services 110 to include in the input file. For example, additional API details may include programmable code that allow applications and services to exchange data and functionality easily and securely. Since the input file only includes a list of service names and/or API details for services 110 and does not include backend databases of services 110, processor 205 may prepare the input file relatively quickly. For example, in some embodiments, processor 205 only needs approximately five minutes to retrieve all service names and API details needed to prepare the input file for more than 400 services operating on primary region 100A. It should be understood by those skilled in the art that the amount of time processor 205 needs to retrieve all service names and API details and prepare the input file depends on the number of services 110 operating on primary region 100A, and thus may differ in various embodiments of the present disclosure.

In step 325, failover method 300 references the input file prepared in step 320 to transfer operation of each service 110 from primary region 100A to secondary region 100B. By referencing the list of service names in the input file, processor 205 may quickly identify each corresponding service 110 that needs to be failed over from primary region 100A to secondary region 100B. After identifying the services 110 that needs to be failed over, processor 205 may modify a service weight corresponding to each service 110 identified by its service name in the input file. In some embodiments, the service weight is a number between 0 and 100. Varying the service weight for a specific service 110 controls that service's system load percentage on primary region 100A versus secondary region 100B. In other words, varying the service weight for a specific service 110 changes how much computational work is done by primary region 100A to operate that service 110 versus how much computational work is done by secondary region 100B to operate that service. For example, setting the service weight to 100 for a service will cause primary region 100A to perform 100% of the computational work necessary to operate the service while secondary region 100B will perform 0% of the computational work necessary to operate the service (i.e., the service operates entirely on primary region 100A). On the other hand, setting the service weight to 0 for a service will cause primary region 100A to perform 0% of the computational work necessary to operate the service while secondary region 100B will perform 100% of the computational work necessary to operate the service (i.e., the service operates entirely on secondary region 100B). In some embodiments, it may also be possible to set a number between 0 and 100 as the service weight for a service. For example, setting the service weight to 50 for a service will cause primary region 100A to perform 50% of the computational work necessary to operate the service and secondary region 100B will perform 50% of the computational work necessary to operate the service (i.e., the service operates half the time on primary region 100A and half the time on secondary region 100B). As another example, setting the service weight to 20 for a service will cause primary region 100A to perform 20% of the computational work necessary to operate the service and secondary region 100B will perform 80% of the computational work necessary to operate the service (i.e., the service operates 20% of the time on primary region 100A and 80% of the time on secondary region 100B). It should be understood by those skilled in the art that the percentage of computational work done by primary region 100A and secondary region 100B must add up to 100%. This ensures that services 110 are always operational and available to client devices 115 on at least one region in the region system configuration 100 as shown in FIG. 1.

In some embodiments of current failover methods, throttling issues may exist when transferring services from the primary region to the secondary region. Throttling is the process of limiting the number of API requests or service requests a region can handle in a certain period of time. Throttling issues may occur when a region (e.g., primary region 100A, secondary region 100B) exceeds a limit in capacity by processing more requests per second to transfer services from the primary region to the secondary region than the region can handle. In some regions currently available on one or more cloud services platforms (e.g., Amazon Web Service), this limit in capacity is approximately five requests per second. If a failover method exceeds this limit in capacity, regions may experience problems including delayed data processing, reduced performance speed, errors and faults leading to rejected requests, etc. Therefore, throttling issues, when existing, may severely impact the efficiency and reliability of failover method 300 to transfer services 110 from primary region 100A to secondary region 100B.

In order to avoid throttling issues as explained above, step 330 of failover method 300 introduces a sleep time after modifying each service weight corresponding to a service 110 to transfer that service 110 from operating on primary region 100A to operating on secondary region 100B. For example, in some embodiments, processor 205 may introduce a one second sleep time between modifying each service weight corresponding to a service 110 identified by a service name in the input file prepared in step 320. If the limit in capacity of primary region 100A is approximately five requests per second, then the introduction of a one second sleep time between each request to transfer a service 110 from primary region 100A to secondary region 100B will ensure that the limit in capacity is never exceeded, thus avoiding any potential throttling issues. It should be understood by those skilled in the art that other embodiments of the present disclosure may introduce a sleep time of any duration, such as half a second or two seconds. Other embodiments of the present disclosure may also introduce the sleep time at a different frequency, for example introducing a sleep time after modifying every other service weight corresponding to a service 110. Therefore, it should be understood by those skilled in the art that the duration of the sleep time introduced in step 330 and the frequency of introducing the sleep time in step 330 described in the present disclosure is for illustrative purposes only and not intended to be exhaustive.

In addition to transferring services 110 from operating on primary region 100A to operating on secondary region 100B, failover method 300 may also transfer databases corresponding to services 110 failed over in steps 320-330. In some embodiments, failover method 300 transfers services 110 simultaneously with transferring databases corresponding to those services 110, as shown in parallel branches respectively containing steps 320-330 and steps 335-340 in FIG. 3. In other embodiments, failover method 300 may transfer all services 110 before transferring databases corresponding to those services 110, or vice versa. In yet other embodiments, failover method 300 may also transfer each service 110 with its corresponding database in a sequential order.

To transfer over databases corresponding to services 110 failed over from primary region 100A to secondary region 100B in steps 320-330 as explained above, failover method 300 performs steps 335-340. Databases exist on the backend of services operating on the region and contain executable program code to perform functions of the services. Because these backend databases contain executable program code that contain more data than the input file containing only a list of service names and/or API details for services 110, failing over backend databases takes considerably more time than failing over services identified by service names in the input file prepared in step 320. For example, failover method 300 may take approximately 20 minutes to failover approximately 50 backend databases whereas failover method 300 may only need approximately 8 minutes to failover approximately 400 services and/or API details for those services. In some embodiments, not every service 110 has a corresponding backend database. In these embodiments, failover method 300 will need to failover less databases than services 110 from primary region 100A to secondary region 100B. Therefore, by failing over services 110 in steps 320-330 simultaneously with failing over databases corresponding to only some of those services 110 in steps 335-340, failover method 300 may conserve time and be more efficient in failing over services 110 and any existing corresponding databases.

Referring to the embodiment shown in FIG. 3, at step 335, failover method 300 transfers all backend databases corresponding to at least some services 110 from primary region 100A to secondary region 100B. In some embodiments having less databases than services, failover method 300 may first check whether a failed over service 110 has a corresponding backend database that also needs to be failed over from primary region 100A to secondary region 100B. If a service 110 has a corresponding backend database, then processor 205 transfers that database from primary region 100A to secondary region 100B in step 335. On the other hand, if a service 110 does not have a corresponding backend database, then processor 205 does not need to failover any database for that service 110 and merely proceeds down the list of service names in the input file to check whether the next identified service 110 has a corresponding backend database. Similar to the failover process for services 110 described above with reference to step 330, failover method 300 may also introduce a sleep time between transferring each database to avoid any potential throttling issues. It should be understood by those skilled in the art that the duration of the sleep time introduced in step 340 and the frequency of introducing the sleep time in step 340 may vary in different embodiments of the present disclosure and is not exhaustively described herein for simplicity.

After completing the failover process for all services 110 (see steps 320-330) and any corresponding backend databases (see steps 335-340), failover method 300 may notify an operator of a status of the failover process according to some embodiments of the present disclosure (see step 345). For example, referring to FIG. 2, after completing steps 305-340 of failover method 300, processor 205 may control display devices 220 to display a message to the operator that failover method 300 has successfully completed. In some embodiments, the status of the failover method 300 may include additional information, such as how many services 110 are failed over, how many backend databases corresponding to the services 110 are failed over, how long the failover process took, any errors experienced during the failover process, etc. It should be understood by those skilled in the art that other parameters may be displayed as part of the status in step 345 and are not exhaustively listed herein.

After the fault detected in primary region 100A in step 305 is no longer detected or resolved, processor 205 may execute instructions for failback operations 236, as shown in the block diagram of FIG. 2. FIG. 4 shows a flowchart illustrating a method 400 for automatically failing back services 110 operating on secondary region 100B to operating on primary region 100A after the fault is no longer detected on primary region 100A.

In decision 405, failback method 400 determines whether the fault initially determined to exist in primary region 100A in step 305 of FIG. 3 is still existing on primary region 100A. If so, failback method 400 executes step 410 and continues to operate services 110 on secondary region 100B. On the other hand, if the fault is no longer determined to exist in primary region 100A, then failback method 400 proceeds to transfer services 110 from operating on secondary region 100B back to operating on primary region 100A. In some embodiments, the process of transferring services 110 from secondary region 100B back to primary region 100A may be similar to steps 320-340 of failover method 300 in FIG. 3 explained above. For example, failback method 400 may also transfer services 110 simultaneously with transferring any corresponding backend databases, as shown in the embodiment depicted in steps 415-435 of FIG. 4, described in further detail below.

To transfer services 110 from secondary region 100B back to primary region 100A, failback method 400 prepares an input file containing a list of service names identifying each service 110, similar to step 320 of failover method 300. In step 420, failback method 400 references the input file to quickly identify each service 110 that needs to be transferred from secondary region 100B back to primary region 100A and modifies a service weight corresponding to each service identified by its service name in the input file. As explained above with reference to step 325 in FIG. 3, the service weight may be a number between 0 and 100 that controls that service's system load percentage on primary region 100A versus secondary region 100B. For example, to transfer a service 110 from secondary region 100B back to primary region 100A, processor 205 may modify the service weight of that service from 0 (i.e., signifying that service operates entirely on secondary region 100B) to 100 (i.e., signifying that service operates entirely on primary region 100A). Similar to step 330 in FIG. 3 as explained above, step 425 of failback method 400 may also introduce a sleep time after modifying each service weight corresponding to a service 110 to avoid any potential throttling issues. It should be understood by those skilled in the art that failback method 400 may introduce a sleep time of any duration and at any frequency in various embodiments of the present disclosure.

To transfer over databases corresponding to at least some services 110 from secondary region 100B back to primary region 100A, failback method 400 performs steps 430-435 shown in the embodiment depicted in FIG. 4. As explained above, failback method 400 may need to transfer less databases than services 110 because not every service 110 has a corresponding backend database. Failback method 400 may transfer services 110 simultaneously with transferring databases corresponding to those services 110 to conserve time, as shown in parallel branches respectively containing steps 415-425 and steps 430-435 in the embodiment of FIG. 4. It should be understood by those skilled in the art that in other embodiments of the present disclosure, failback method 400 may transfer all services 110 before transferring databases corresponding to those services 110, transfer all databases before transferring corresponding services 110, or transfer each service 110 with its corresponding database in a sequential order.

In step 430, failback method 400 transfers all backend databases corresponding to at least some services 110 from operating on secondary region 100B back to operating on primary region 100A. To avoid any potential throttling issues, failback method 400 may introduce a sleep time between transferring each database, similar to step 340 of FIG. 3. It should be understood by those skilled in the art that failback method 400 may introduce a sleep time of any duration and at any frequency in various embodiments of the present disclosure.

After successfully transferring all services 110 and any corresponding backend databases from secondary region 100B back to primary region 100A, failback method 400 starts operating all services on primary region 100A in step 440. In some embodiments, failback method 400 may also notify an operator of a status of the failback process in step 445. For example, after completing steps 415-440 of failback method 400, processor 205 may control display devices 220 to display a message to the operator that failback method 400 has successfully completed. In some embodiments, the status of the failback method 400 may include additional information, such as how many services 110 are failed back from secondary region 100B to primary region 100A, how many backend databases corresponding to the services 110 are failed back, how long the failback process took, any errors experienced during the failback process, whether the fault on primary region 100A has been resolved, how the fault on primary region 100A was resolved, how long services 110 were operating on secondary region 100B, etc. It should be understood by those skilled in the art that other parameters may be displayed as part of the status in step 445 and are not exhaustively listed herein.

Figure 5:
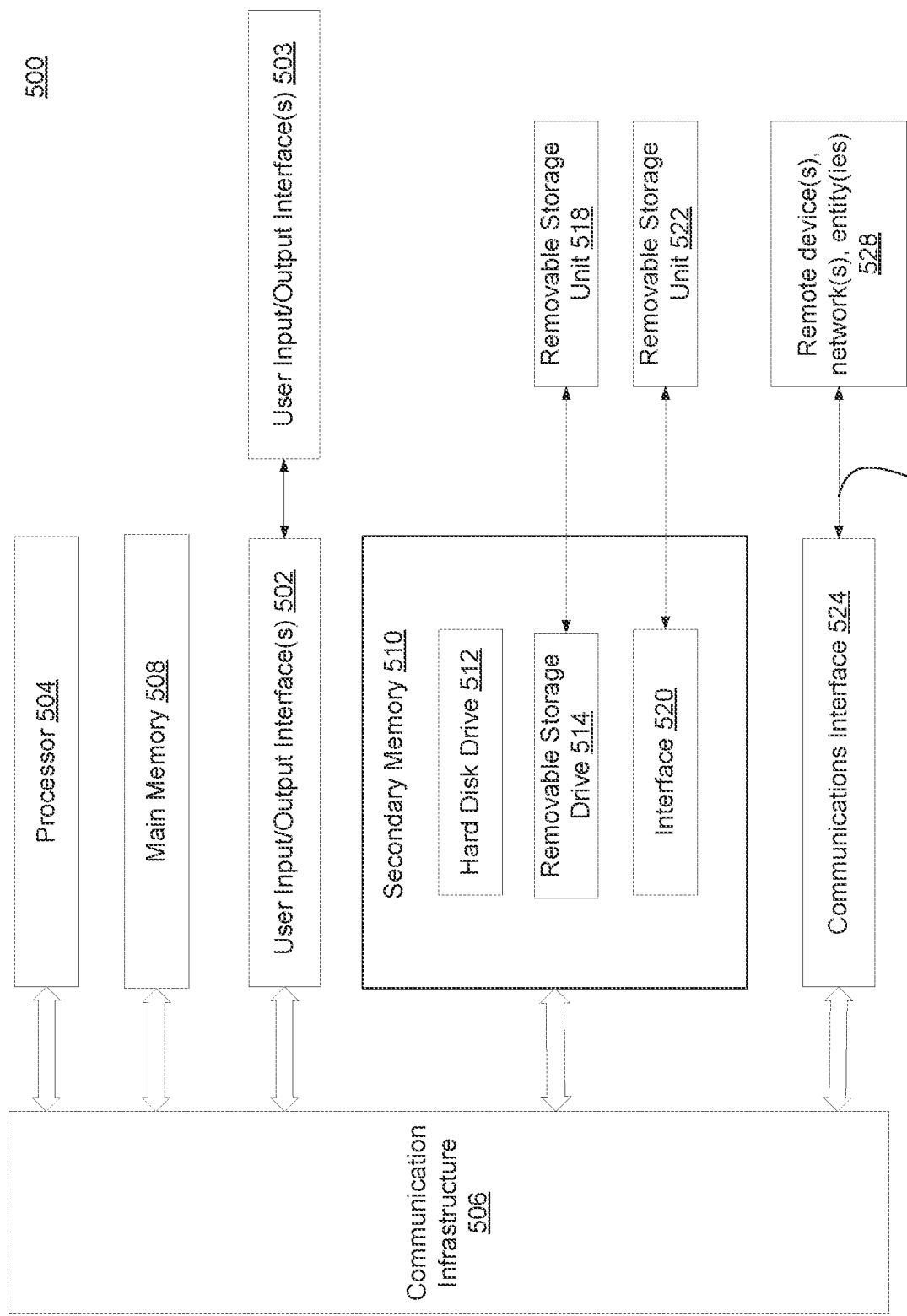
FIG. 5 illustrates an exemplary computer system capable of implementing the method for automatically failing over/ failing back services according to one embodiment of the present disclosure.

FIG. 5 illustrates an exemplary computer system capable of implementing the method for optimizing IT system infrastructure configurations according to one embodiment of the present disclosure.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer system 500 may be used to implement method 300, region 110, resources 105, client devices 106, and cloud environment 100, as described above with reference to FIGS. 1-4.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities or other approaches for allowing computer programs and/or other instructions and/or data to be accessed by the computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or region, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for switching a plurality of services from operating on a first region to a second region, the method comprising:
preparing, by a processor, an input file comprising a plurality of service names, each service name of the plurality of service names identifying a service in the plurality of services operating on the first region;
modifying, by the processor referencing the input file, a plurality of service weights, each service weight of the plurality of service weights corresponding to a service name in the plurality of service names, and each service weight controlling a system load percentage of the service identified by the corresponding service name; and
introducing a sleep time after modifying each service weight of the plurality of service weights.

2. The method according to claim 1, further comprising:
determining, by the processor, whether there is a fault in the first region; and
switching the plurality of services from operating on the first region to the second region based on the determination of the fault.

3. The method according to claim 2, wherein switching the plurality of services from operating on the first region to the second region further comprises:

switching a plurality of databases from operating on the first region to the second region, each database of the plurality of databases corresponding to a service name in the plurality of service names.

4. The method according to claim 3, wherein modifying the plurality of service weights and switching the plurality of databases occurs substantially simultaneously.

5. The method according to claim 1, wherein controlling the system load percentage controls how much computational work is done by the first region versus the second region to process the service identified by the corresponding service name.

6. The method according to claim 1, wherein modifying each service weight of the plurality of service weights comprises setting a number between 0 and 100 as the system load percentage.

7. The method according to claim 6,
wherein setting the system load percentage to 100 indicates that the service identified by the corresponding service name is operating entirely on the first region, and
wherein setting the system load percentage to 0 indicates that the service identified by the corresponding service name is operating entirely on the second region.

8. The method according to claim 1, further comprising:
notifying a user of a status of switching the plurality of services from operating on the first region to the second region.

9. A system for switching a plurality of services from operating on a first region to a second region, the system comprising:
a memory for storing instructions;
one or more processors, communicatively coupled to the memory, configured to execute the instructions, the instructions causing the one or more processors to:
prepare, by the one or more processors, an input file comprising a plurality of service names, each service name of the plurality of service names identifies a service in the plurality of services operating on the first region;
modify, by reference to the input file, a plurality of service weights, each service weight of the plurality of service weights corresponds to a service name in the plurality of service names, and each service weight controls a system load percentage of the service identified by the corresponding service name; and
introduce a sleep time after modifying each service weight of the plurality of service weights.

10. The system according to claim 9, wherein the instructions further cause the one or more processors to:
determine whether there is a fault in the first region; and
switch the plurality of services from operating on the first region to the second region based on the determination of the fault.

11. The system according to claim 10, wherein switching the plurality of services from operating on the first region to the second region further comprises:
switch a plurality of databases from operating on the first region to the second region, each database of the plurality of databases corresponding to a service name in the plurality of service names.

12. The system according to claim 11, wherein there are less databases in the plurality of databases than service weights in the plurality of service weights.

13. The system according to claim 9, wherein the system load percentage defines how much computational work is done by the first region versus the second region to process the service identified by the corresponding service name.

14. The system according to claim 9, wherein the system load percentage is set to a number between 0 and 100 to modify each service weight of the plurality of service weights.

15. The system according to claim 14,
wherein the system load percentage is set to 100 such that the service identified by the corresponding service name operates entirely on the first region, and
wherein the system load percentage is set to 0 such that the service identified by the corresponding service name operates entirely on the second region.

16. A non-transitory, tangible computer-readable device having instructions stored thereon that, when executed by at least one computing device, cause the at least one computing device to perform operations comprising:
preparing, by the at least one computing device, an input file comprising a plurality of service names, each service name of the plurality of service names identifying a service in a plurality of services operating on a first region;
modifying, by referencing the input file, a plurality of service weights, each service weight of the plurality of service weights corresponding to a service name in the plurality of service names, and each service weight controlling a system load percentage of the service identified by the corresponding service name; and
introducing a sleep time after modifying each service weight of the plurality of service weights.

17. The non-transitory, tangible computer-readable device of claim 16, wherein the instructions, when executed by the at least one computing device, further cause the at least one computing device to perform operations of:
receiving an indication that there is a fault in the first region; and
initiating switching the plurality of services from operating on the first region to a second region based on the received indication of the fault.

18. The non-transitory, tangible computer-readable device of claim 17, wherein initiating switching the plurality of services from operating on the first region to the second region further comprises:
initiating switching a plurality of databases from operating on the first region to the second region, each database of the plurality of databases corresponding to a service name in the plurality of service names.

19. The non-transitory, tangible computer-readable device of claim 18, wherein modifying the plurality of service weights and switching the plurality of databases occurs substantially simultaneously.

20. The non-transitory, tangible computer-readable device of claim 17,
wherein controlling the system load percentage defines how much computational work is done by the first region versus the second region to process the service identified by the corresponding service name,
wherein modifying each service weight of the plurality of service weights comprises setting a number between 0 and 100 as the system load percentage,
wherein setting the system load percentage to 100 indicates that the service identified by the corresponding service name is operating entirely on the first region, and wherein setting the system load percentage to 0 indicates that the service identified by the corresponding service name is operating entirely on the second region.

\* \* \* \* \*